Dec. 20, 1955 T. TURNER 2,728,002
TERMINAL BLOCK
Filed April 13, 1953
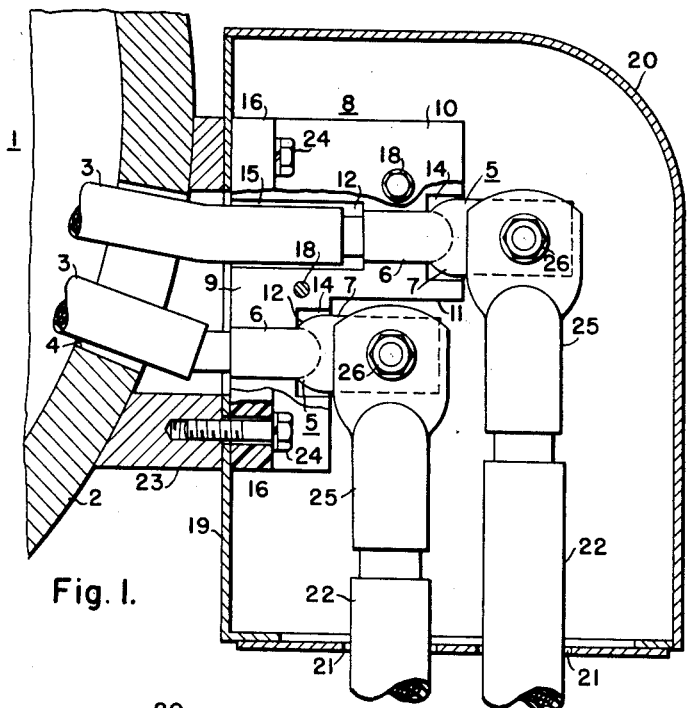
Fig. 1.
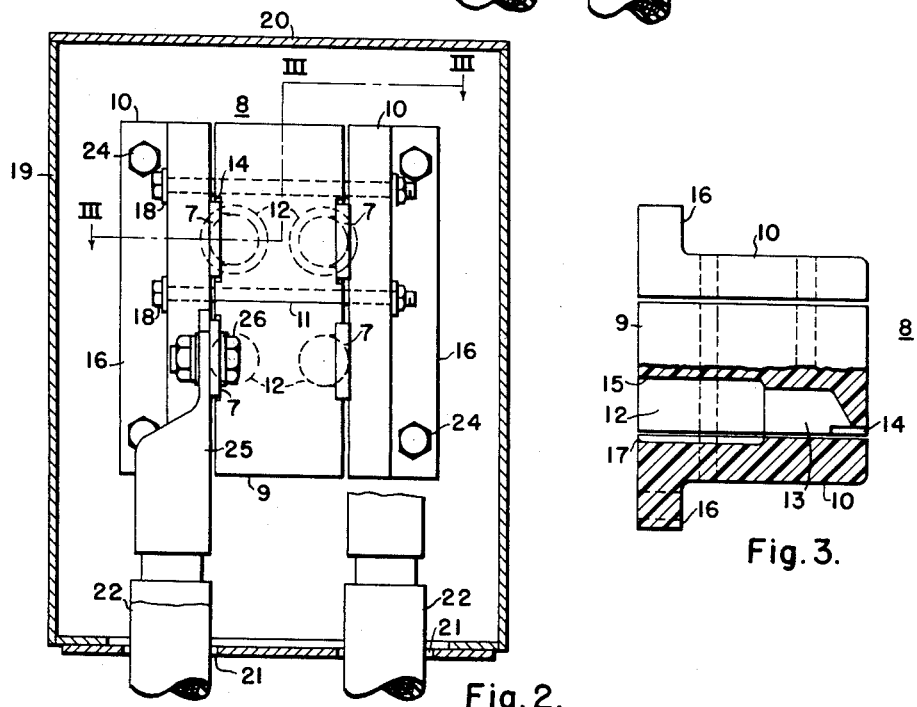
Fig. 2.
Fig. 3.
WITNESSES:
John E. Hensley
Leon M. Gorman
INVENTOR
Tom Turner
BY F. C. Lyle
ATTORNEY United States Patent Office 2,728,002
Patented Dec. 20, 1955

2,728,002

TERMINAL BLOCK

Tom Turner, Eggertsville, N. Y., assignor to Westinghouse Electric Corporation, East Pittsburgh, Pa., a corporation of Pennsylvania Application April 13, 1953, Serial No. 348,492

10 Claims. (Cl. 310—71)

The present invention relates to terminal blocks and, more particularly, to a simple and inexpensive terminal block for facilitating the electrical connections to dynamoelectric machines.

Electric motors and generators, both alternating current and direct current, of the so-called industrial sizes, that is, with ratings from 1 to about 500 horsepower, have usually been connected to the external circuit or line by means of leads brought out from the machine windings through an opening in the frame into a junction box, or conduit box, mounted on the frame. The leads have suitable terminal devices attached to their ends, and the line leads are provided with similar terminal devices and are brought into the junction box and connected to the machine leads by bolting the corresponding terminal devices together. Since there is no support for the leads in the junction box, the connections must be carefully taped individually, in order to prevent any possibility of short-circuits or grounds caused by the terminals touching each other or the junction box. This taping is a tedious and time-consuming operation which adds materially to the cost of installing a machine, and it also requires the junction box to be relatively large to provide adequate room for separating the leads during connection and taping.

The principal object of the present invention is to provide an improved terminal block adapted to receive electrical leads provided with terminal devices and to hold them against substantial movement.

Another object of the invention is to provide a relatively simple and inexpensive terminal block, especially suitable for use on dynamoelectric machines, which holds the machine leads and their terminals against substantial movement, so that the connection of line leads to the machine leads is facilitated, and no taping of the connections is required.

A further object of the invention is to provide a terminal block for dynamoelectric machines, which holds the machine leads against substantial movement and which can readily be mounted on the machine together with a junction box and easily changed in position to permit the line leads to be brought in from different directions.

Other objects and advantages of the invention will be apparent from the following detailed description of one embodiment of the invention, taken in connection with the accompanying drawing, in which:

Figure 1 is a side view of a terminal block mounted on a dynamoelectric machine, the side member of the terminal block being partly broken away;

Fig. 2 is a front view of the terminal block; and

Fig. 3 is a top plan view of the terminal block, partly in section on the line III—III of Fig. 2.

As indicated above, the new terminal block is particularly intended for use on dynamoelectric machines, and is shown in Fig. 1 applied to a machine 1 which may be a motor or generator of any type, either alternating current or direct current. The machine 1 has not been shown in detail since it may be any type of dynamoelectric machine and its construction is not a part of the invention.

The machine 1 has a frame or housing 2 and is connected to an external circuit or line by means of leads 3 brought out from the machine windings and passing through an opening 4 in the frame 2. The leads 3 are provided with terminal devices 5 of any suitable or usual type. As shown, the terminal devices 5 have a round, hollow portion 6 for receiving the leads 3 and a flat, extending blade portion 7. The terminal devices 5 are secured to the conductors of the leads 3 by soldering or crimping, or in any other usual or suitable manner.

The terminal block 8, in the embodiment shown in the drawing, consists of a central member 9 and two side members 10. The members 9 and 10 may be molded of any suitable rigid insulating material, and preferably are completely formed in the molding operation, with all recesses and other openings, so that no further manufacturing work is required after the molding operation, thus providing a relatively inexpensive construction.

The central member 9 is of stepped configuration, as clearly shown in Fig. 1, so that its upper portion is of greater thickness than its lower portion, providing a step or transverse surface 11. Recesses 12 are formed in the sides of the central member 9 to receive the leads 3 and terminal devices 5. Each of the recesses 12 has a round portion 13 to receive the round base of the terminal device or the machine lead, and has a thin slot portion 14 to receive the blade portion 7 of the terminal device. The recess in the upper part of the central member 9 is, of course, of greater length than the recess in the lower part, and it may have an additional round section 15 of larger size to accommodate the insulated end of the lead 3. It will be noted that the height of the slot portion 14 of the recesses is greater than the diameter of the round portions 13 and 15, and that the width or thickness of the slot portion 14 is less than the diameter of the round portions. The ends of the leads and the terminal devices fit snugly in the recesses 12, and because of their proportions, the leads and terminal devices are prevented from moving axially in the recess, since the blade portion 7 of the terminal is too wide to enter the round portion, and the diameter of the lead or of the round base 6 of the terminal is too large to permit it to enter the slot portion 14 of the recess. Thus, substantial movement of the leads and terminal devices is prevented.

The side members 10 are also of stepped configuration to conform to the shape of the central member 9, and they are provided with flange portions 16 for mounting the terminal block. The side members 10 may have plane surfaces for engaging the leads and terminals to hold them in the recesses 12, or if desired, the side members 10 may have depressions 17 to cooperate with the recesses in the central member 9. After the leads 3 and terminal devices 5 have been placed in the recesses in the central member 9, the side members 10 are put in position, and the terminal block is clamped together by means of through bolts 18 extending through openings formed in the side members and central member to rigidly clamp the assembly together and to hold the leads and terminal devices in place. The bolts 18 are located so that they cannot cause a short circuit of the terminals. It will be seen that when completely assembled, the terminal block 8 holds the leads and terminal devices in place and prevents any substantial movement of the leads with respect to the terminal block. The stepped configuration of the block causes the upper terminal devices to extend beyond the lower terminal devices, as shown in Fig. 1, and the proportions are preferably such that the lower terminal devices do not extend beyond the step surface 11.

The terminal block 8 is disposed within a junction box 19 which may be made of thin sheet metal and is provided with a removable cover 20. The junction box 19 may be of any suitable or usual type and has an opening or openings 21 in its lower surface for line leads 22 which may be brought into the junction box through a conduit, or conduits, if desired, in the usual manner. The junction box 19 is supported on a spacing member 23. The spacing member 23 is shown as a cylindrical casting having one flat surface and one surface curved to conform to the frame 2 of the machine 1. The spacing member 23 encircles the opening 4 in the frame and may be welded or otherwise attached to the frame, the joint being sealed in any suitable manner, if necessary. The leads 3 pass through the spacing member 23 and are attached to the terminal block 8, as described above.

The terminal block 8 is mounted in position by means of bolts 24 which pass through openings in the flanges 16 and are threaded into tapped holes in the spacing member 23. The sheet metal rear surface of the junction box 19 rests against the flat surface of the spacing member 23 and is clamped in position between the terminal block and the spacing member by bolts 24, thus holding the junction box in its normal position.

The line leads 22, to which the machine 1 is to be connected, are provided with terminal devices 25 which may be of the same type as the terminal devices 5. The line leads 22 are brought into the junction box and are connected to the proper machine leads by bolting the blade portions of the respective terminal devices together by means of bolts 26. Since the leads 3 and terminal devices 5 are held against substantial movement in the terminal block 8, the line leads can readily be connected to the proper machine terminals, and there is no possibility of the different terminals touching each other or grounding on the interior of the junction box.

The upper terminals 5 extend outward beyond the lower terminals, because of the stepped configuration of the terminal block, so that there is no interference between the leads 22 to the upper and lower terminal devices. The terminals 25 of the line leads connected to the lower machine terminals 5 are prevented from any possible contact with the upper terminals by the step surface 11. In view of the foregoing, it will be apparent that no taping of the connections is required since any contact between the different terminals, or between any of the terminals and the junction box, is positively prevented; and the operation of connecting the line leads to the machine terminals is greatly facilitated, and the time required is greatly reduced, since it is only necessary to bring the line leads into the junction box and bolt their terminals to the corresponding machine terminals.

The line leads 22 are usually brought into the junction box 19 from the bottom, as shown in the drawing, but it is sometimes necessary or desirable to bring these leads in from one side or from the top. This is easily possible with the new terminal block since, if it is desired to bring the leads in from either side, it is only necessary to remove the bolts 24 and rotate the terminal block 8 and junction box 19 90° in the desired direction and then reinsert the bolts 24. The machine leads 3 can be twisted in the opening 4 sufficiently to permit this movement, so that the line leads 22 can readily be brought in from either side.

If it is desired to bring the line leads in from the top, the terminal block 8 is removed by removing the bolts 24, and the through bolts 18 are removed to release the machine leads 3 from the terminal block. The terminal block can then be turned 180° and the leads replaced in the recesses of the central member 9, the upper machine leads 3 being pushed back into the machine, and the lower machine leads 3 being pulled out, sufficiently to permit this. The terminal block is then reassembled by insertion of the through bolts 18, and the terminal block 8 and junction box 19 are replaced on the machine by means of the bolts 24, the junction box, of course, also being rotated 180° to permit the line leads to be brought in from the top. Thus, the new terminal block permits the leads to be brought in from any desired direction with no difficulty.

The terminal block 8 has been described with particular reference to a four lead arrangement primarily intended for direct current machines. It will be apparent, however, that the block can readily be adapted to any desired number or arrangement of leads to permit its use with any type of machine, either alternating current or direct current. Thus, three or even more steps might be provided to permit the leads to be disposed at three or more levels, and the central member 9 might be divided into parts to permit additional leads to be inserted in recesses between its parts. Thus, the terminal block is readily adaptable to any desired number or arrangement of leads for any type of dynamoelectric machine.

It should now be apparent that a terminal block has been provided which greatly reduces the time required, and facilitates the connection of the line leads to the terminals of a dynamoelectric machine since no taping of the connections is required and the making of the connections is facilitated because the machine leads and terminals are held in fixed position. The terminal block is of simple and inexpensive construction and is quickly and easily assembled and mounted on a machine.

A specific embodiment of the invention has been shown and described for the purpose of illustrations, but it will be obvious that various modifications and other embodiments are possible within the scope of the invention, and it is to be understood that the invention is not restricted to the specific details of construction shown, but in its broadest aspects, it includes all equivalent embodiments and modifications.

I claim as my invention:

1. A terminal block comprising, a central member of insulating material, a side member of insulating material at each side of said central member, and means for securing the side members to the central member, said terminal block having recesses between the central member and the side members, each of said recesses having a round portion adapted to receive an electrical conductor and a slot portion adapted to receive a terminal device, the height of the slot portion being greater than the diameter of the round portion and the width of the slot portion being less than the diameter of the round portion.

2. A terminal block comprising, a central member of insulating material, a side member of insulating material at each side of said central member, and means for securing the side members to the central member, said terminal block having recesses between the central member and the side members adapted to receive electrical leads and terminal devices and to hold them against substantial movement, said central member and side members being of stepped configuration, whereby certain of said terminal devices extend beyond others of the terminal devices.

3. A terminal block comprising, a central member of insulating material, a side member of insulating material at each side of said central member, and means for securing the side members to the central member, said terminal block having recesses between the central member and the side members, each of said recesses having a round portion adapted to receive an electrical conductor and a slot portion adapted to receive a terminal device, the height of the slot portion being greater than the diameter of the round portion and the width of the slot portion being less than the diameter of the round portion, said central member and side members being of stepped configuration, whereby certain of said terminal devices extend beyond others of the terminal devices.

4. A terminal block for an electrical device having leads extending therefrom, said leads having terminal devices thereon, said terminal block comprising, a central member of insulating material, a side member of insulating material at each side of the central member, means for securing the side members to the central member, said terminal block having recesses between the central member and the side members for receiving said leads and terminal devices, each of the recesses having a portion for receiving a lead and a portion for receiving a terminal device, the recesses being proportioned so that the lead cannot pass through the terminal-receiving portion of the recess and the terminal device cannot pass through the lead-receiving portion of the recess, whereby the leads are held against substantial movement.

5. A terminal block for an electrical device having leads extending therefrom, said leads having terminal devices thereon, said terminal block comprising, a central member of insulating material, a side member of insulating material at each side of the central member, means for securing the side members to the central member, said terminal block having recesses between the central member and the side members for receiving said leads and terminal devices, each of the recesses having a portion for receiving a lead and a portion for receiving a terminal device, the recesses being proportioned so that the lead cannot pass through the terminal-receiving portion of the recess and the terminal device cannot pass through the lead-receiving portion of the recess, whereby the leads are held against substantial movement, and said terminal block being of stepped configuration to cause certain of said terminal devices to extend beyond others of the terminal devices.

6. A terminal block for an electrical device having leads extending therefrom, said leads having terminal devices thereon, said terminal block comprising, a central member of insulating material, said central member having recesses in its side surfaces for receiving said leads and terminal devices, each of the recesses having a portion for receiving a lead and a portion for receiving a terminal device, the recesses being proportioned so that the lead cannot pass through the terminal-receiving portion of the recess and the terminal device cannot pass through the lead-receiving portion of the recess, a side member at each side of the central member, and means for securing the side members to the central member to hold the leads and terminal devices in the recesses.

7. A terminal block for an electrical device having leads extending therefrom, said leads having terminal devices thereon, said terminal block comprising, a central member of insulating material, said central member having recesses in its side surfaces for receiving said leads and terminal devices, each of the recesses having a round portion for receiving a lead and a slot portion for receiving a terminal device, the height of the slot portion being greater than the diameter of the round portion and the width of the slot portion being less than the diameter of the round portion, a side member at each side of the central member, and means for securing the side members to the central member to hold the leads and terminal devices in the recesses.

8. A terminal block for an electrical device having leads extending therefrom, said leads having terminal devices thereon, said terminal block comprising, a central member of insulating material, said central member having recesses in its side surfaces for receiving said leads and terminal devices, each of the recesses having a round portion for receiving a lead and a slot portion for receiving a terminal device, the height of the slot portion being greater than the diameter of the round portion and the width of the slot portion being less than the diameter of the round portion, a side member at each side of the central member, and means for securing the side members to the central member to hold the leads and terminal devices in the recesses, the terminal block being of stepped configuration to cause certain of said terminal devices to extend beyond others of the terminal devices.

9. In combination, a dynamoelectric machine having a frame, a spacing member attached to the frame, said spacing member surrounding an opening in the frame, one side of the spacing member conforming to the shape of the frame and the opposite side of the spacing member having a substantially flat surface, said machine having leads extending through the opening and terminal devices on the leads, a junction box adapted to be supported on the flat surface of the spacing member, a terminal block in the junction box, said terminal block comprising a central member of insulating material, a side member of insulating material at each side of the central member, means for securing the side members to the central member, said terminal block having recesses between the central member and the side members for receiving said leads and terminal devices, each of the recesses having a portion for receiving a lead and a portion for receiving a terminal device, the recesses being proportioned so that the lead cannot pass through the terminal-receiving portion of the recess and the terminal device cannot pass through the lead-receiving portion of the recess, and means for securing the terminal block to the spacing member with the junction box clamped against the spacing member by the terminal block.

10. In combination, a dynamoelectric machine having a frame, a spacing member attached to the frame, said spacing member surrounding an opening in the frame, one side of the spacing member conforming to the shape of the frame and the opposite side of the spacing member having a substantially flat surface, said machine having leads extending through the opening and terminal devices on the leads, a junction box adapted to be supported on the flat surface of the spacing member, a terminal block in the junction box, said terminal block comprising a central member of insulating material, a side member of insulating material at each side of the central member, means for securing the side members to the central member, said terminal block having recesses between the central member and the side members for receiving said leads and terminal devices, each of the recesses having a portion for receiving a lead and a portion for receiving a terminal device, the recesses being proportioned so that the lead cannot pass through the terminal-receiving portion of the recess and the terminal device cannot pass through the lead-receiving portion of the recess, the terminal block being of stepped configuration to cause certain of the terminal devices to extend beyond others of the terminal devices, and means for securing the terminal block to the spacing member with the junction box clamped against the spacing member by the terminal block.

References Cited in the file of this patent

UNITED STATES PATENTS

| | | |
|---|---|---|
| 589,760 | Tailleur | Sept. 7, 1897 |
| 1,260,592 | Sturgeon | Mar. 26, 1918 |
| 2,038,353 | Gardner et al. | Apr. 21, 1936 |
| 2,321,999 | Dalton | June 15, 1943 |
| 2,403,642 | Draxler | July 9, 1946 |
| 2,507,242 | Bost | May 9, 1950 |
| 2,531,719 | Alvino | Nov. 28, 1950 |
| 2,533,673 | Lasserre | Dec. 12, 1950 |
| 2,652,506 | Furnas et al. | Sept. 15, 1953 |